United States Patent

Vary

[11] Patent Number: 5,599,227
[45] Date of Patent: Feb. 4, 1997

[54] CUTTING DEVICE

[76] Inventor: Frank R. C. Vary, P.O. Box 183, Kyogle, Australia, NSW 2474

[21] Appl. No.: 407,388

[22] Filed: Mar. 17, 1995

[30] Foreign Application Priority Data

Mar. 17, 1994 [AU] Australia ................. PM4515

[51] Int. Cl.$^6$ .................................................. B26B 15/00
[52] U.S. Cl. ............................ 452/166; 452/167; 30/228
[58] Field of Search .................................. 452/166, 167, 452/64, 135; 30/92, 180, 182, 228, 241, 306; 606/163

[56] References Cited

U.S. PATENT DOCUMENTS

| 2,674,003 | 4/1954 | Langenbahn | 452/64 |
| 2,764,813 | 10/1956 | Hoffman | 30/228 |
| 3,052,980 | 9/1962 | Fieser | 30/228 |
| 3,177,584 | 4/1965 | Cockerill | 30/228 |
| 3,599,329 | 8/1971 | Batt | 30/228 |
| 3,676,929 | 7/1973 | Nicholson | 30/228 |
| 3,995,369 | 12/1976 | Duff | 30/228 |
| 4,106,194 | 8/1978 | Steed | 30/228 |
| 4,474,178 | 10/1984 | Hyatt | 30/228 |
| 4,577,407 | 3/1986 | Hahn | 452/135 |
| 4,627,167 | 12/1986 | Karubian et al. | 30/228 |

FOREIGN PATENT DOCUMENTS

| 22731/77 | 2/1976 | Australia . |
| 33895/89 | 5/1988 | Australia . |
| 54639/90 | 5/1989 | Australia . |
| 117348 | 6/1993 | Australia | 30/8 |

Primary Examiner—Willis Little
Attorney, Agent, or Firm—John E. Reilly

[57] ABSTRACT

A lightweight, portable animal dehorner has fixed and movable cutter blades mounted in a common frame, the movable blade being driven toward and away from the fixed blade by an air brake chamber connected to a source of air under pressure, and a hand grip supports the air brake chamber in driving relation to the movable blade. A receptacle for severed horns may be attached to the cutter blade frame.

7 Claims, 5 Drawing Sheets

CUTTING DEVICE

BACKGROUND AND FIELD OF INVENTION

This invention relates to cutting devices which can be used for operations such as animal dehorning, cutting of cables and ropes, and cutting of plastic and soft metal when rapid cutting action is required.

Animal dehorning and cutting of thick cables and ropes can be difficult operations to perform using hand-operated shears. Mechanical devices have been developed to facilitate such operations. For example, pneumatically or hydraulically powered dehorners are described in Australian Patent Application No. 54639/90 and Australian Patent Application No. 33895/89, respectively. Australian Patent Application No. 22731/77 discloses a cutting device which can be powered either pneumatically or hydraulically.

Hydraulically powered cutting devices have had the disadvantage that a source of hydraulic fluid must be available. This is usually provided by coupling the device to the hydraulic system of a tractor. Whatever the source of hydraulic fluid, flexible hydraulic lines are used to connect the source to the device. The weight of hydraulic lines when charged with fluid coupled with the weight of the device can compromise the advantage gained by mechanization of the device.

The lighter lines used to connect an air source to pneumatically powered cutting devices and the generally lighter components making up the devices lead to devices which require less effort to operate than hydraulically powered devices. However, known pneumatically powered devices tend to be unreliable under rapid repetitive use conditions and frequently lack the power for efficient cutting in operations such as animal dehorning.

A further disadvantage of both pneumatically and hydraulically powered cutting devices is that specially engineered components are typically required to fabricate devices. This can have an adverse effect on manufacturing costs as components must be made to order rather than being taken from normal stock items.

There is therefore a need for a cutting device, suitable in particular for use in animal dehorning, which takes advantage of the lightness of pneumatically powered devices but overcomes the disadvantages of existing devices. In particular, there is a need for a cutting device which is reliable, is sufficiently powerful for use in operations such as animal dehorning, and can be fabricated from readily available components.

SUMMARY OF THE INVENTION

It is an object of the present invention to provide a cutting device, which can be used for operations such as animal dehorning, and which may overcome the disadvantages of known cutting devices.

According to a broad format, this invention provides a cutting device having cutting means adapted to be operated by a diaphragm type air brake chamber, the device including a hand grip extending outwardly of each side of said cutting means and rearwardly thereof.

The cutting means can be a single blade or a pair of blades. In embodiments of the invention where the cutting means comprises a pair of blades, one of the blades is fixed while the second blade can move between a position where it is away from the first blade to a position where the edge of the blade overlaps the edge of the first blade.

In preferred embodiments, the cutting means further comprises a frame in which the fixed blade is secured and the movable blade can slide. Alternatively, the fixed blade can be secured to a frame member to which the movable blade is pivotably mounted. The frame can have a gap therein to allow objects to be placed within the cutting means. The gap can be provided by a releasable portion of the frame.

The adaptation for operation of the cutting means by the air brake chamber comprises coupling the output shaft of the chamber to the movable blade of the cutting means. A bracket is typically provided to support the air brake chamber adjacent the cutting means.

Means are also provided to connect an air supply hose to the air brake chamber. A valve is included within the connection means to control supply of air to the chamber. Advantageously, the valve is operated by a trigger.

The hand grip is typically a continuous member which extends from an end of the bracket around the rear of the air brake chamber to the other end of the bracket and advantageously lies in essentially the same plane as the cutting means.

The position of the hand grip is preferably such that the device can adopt a balanced condition when held with two hands. The trigger for the air supply control valve is advantageously positioned near the hand grip so that it can be contacted by the thumb of the operator. The device can be configured for use by a left handed or a right handed operator.

Means for bleeding air from the air brake chamber can be provided. Typically, the air bleed is incorporated into the air supply control valve.

In an adaption of the device for animal dehorning, there is provided a receptacle for severed horns, which receptacle is attached to the cutting means. The receptacle advantageously includes a plate at the mouth thereof which can be fixed to the frame of the cutting means. The fixing can be by screws, bolts, spring-loaded clips or the like.

The receptacle is typically a bag of flexible material having a sealable opening therein to allow severed horns to be removed from the receptacle. Advantageously, the bag portion of a receptacle includes a rigid or semi-rigid frame to maintain the bag in a configuration appropriate for receiving severed horns.

The cutting means, air brake chamber, air supply connection and air supply valve are advantageously obtained from suppliers of mechanical equipment known to those of skill in the art. The size of the air brake chamber is determined by the operation to which the device will be put. For animal dehorning operations, the preferred air brake chamber is a chamber having a diaphragm area of 232 $cm^2$ (36 $in^2$).

Other components of the device can be fabricated from any suitable material. Typically, the bracket and hand grip are made from a metal or a metal alloy. A preferred material for the hand grip is tubular aluminum.

In operation, an air supply is connected to the device. The air supply is typically a portable air compressor capable of delivering 650 to 850 kPa. Opening of the air supply valve delivers air to the air brake chamber and air pressure on the diaphragm causes the blade connected to the output shaft to move away from the chamber (and towards the fixed blade if fitted). Closure of the air supply valve and pressure on the diaphragm by biasing means in the air brake chamber causes the movable blade to move back towards the chamber so that the cutting cycle can be repeated. Return of the movable blade can be aided by bleeding of air from the air brake chamber.

Use of the device according to the invention for animal dehorning can be facilitated by suspending the device from a point above the area of operation. For this purpose, a hook or eyelet can be fixed to the device advantageously at or near the center of gravity. The device is typically resiliently suspended from the point above the work area.

It will be appreciated that for dehorning, an animal is preferably held in a bail to restrain the animal and to particularly prevent excessive head movement. With a suspended device, bilateral dehorning can be quickly achieved with considerably less effort as is required for a device which is suspended from above.

So that the invention can be more fully understood, a cutting device suitable for use as an animal dehorner will be exemplified by reference to the drawings briefly described below.

DETAILED DESCRIPTION OF PREFERRED EMBODIMENT

Figure 1:
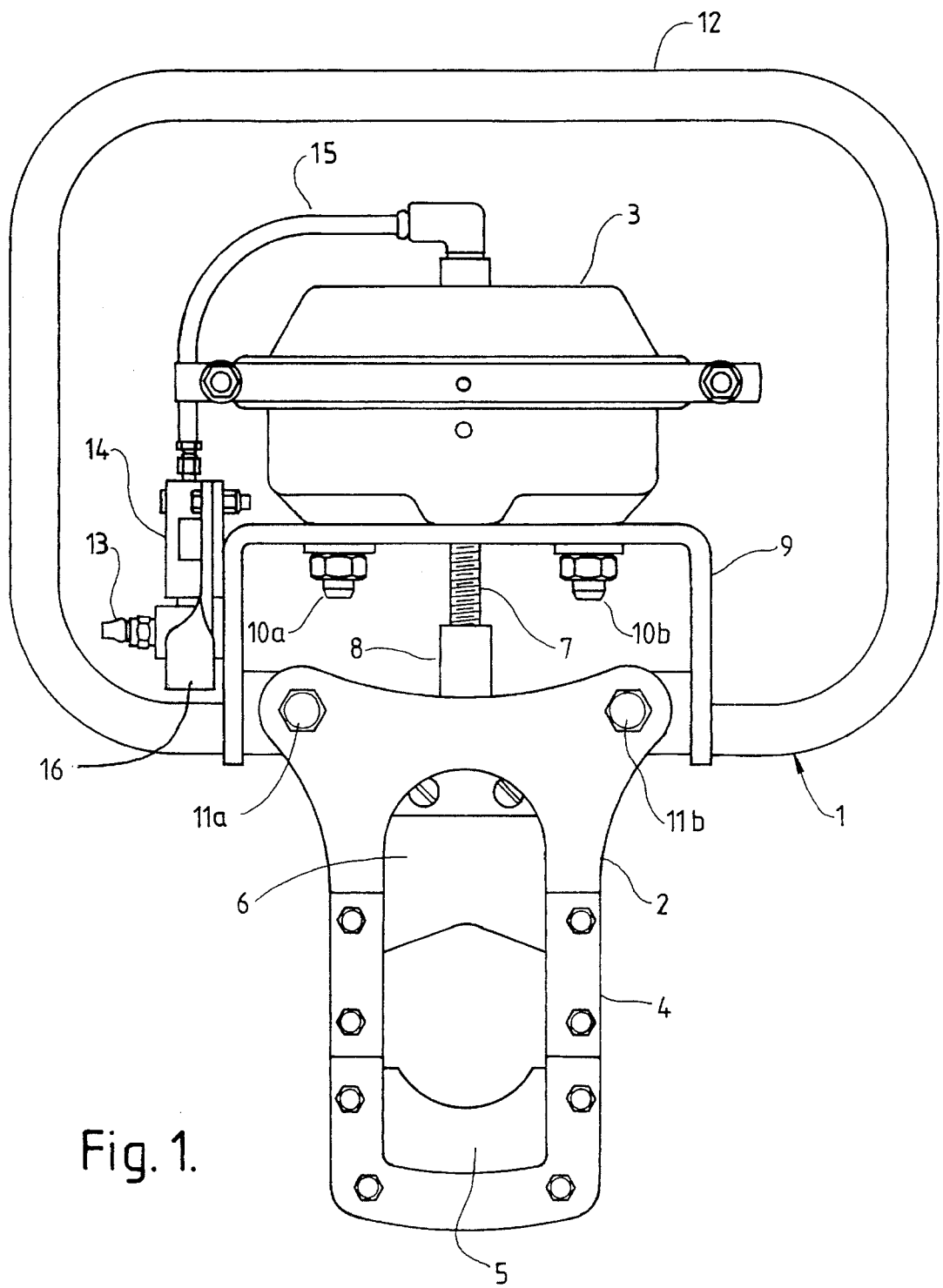
FIG. 1 is a plan view of the cutting device.

Referring now to FIG. 1, there is shown a cutting device 1 comprising cutting means 2 and air brake chamber 3. Cutting means 2 consists of frame 4 in which is mounted fixed blade 5 and movable blade 6. Cutting means 2 in this example is the head of a large Keystone™ dehorner manufactured by Dominion Surgical Pty Ltd of 21 Frederick Street, Northgate, Qld 4013, Australia. Other suitable cutting means are the heads of a medium Keystone™ dehorner, or a "Hodges" cap dehorner, both also manufactured by Dominion Surgical Pty Ltd. A preferred form of air brake chamber is a chamber having a diaphragm area of 232 $cm^2$ (36 $in^2$) with a spring return mechanism to retract movable blade 6 of the cutting means 2 at the end of each cutting operation, a representative air brake chamber 3 being Model 36 manufactured and sold by Anchorlock Brake Division of 2910 East Ana Street, Compton, Calif. 90221.

Movable blade 6 of cutting means 2 is connected to output shaft 7 of air brake chamber 3 by connecting member 8. Bracket 9 is provided to support air brake chamber 3 on cutting means 2. Air brake chamber 3 is fixed to bracket 9 via studs 10a and 10b. Cutting means 2 is similarly fixed to bracket 9 via means 11a and 11b.

A hand grip 12 is attached to bracket 9.

Air supply to brake chamber 3 is via connector 13 through air supply valve 14 and air hose 25. Air supply valve 14 has fitted thereto trigger 16 which is operable by the thumb of hand gripping hand grip 12. Air supply valve 14 is fixed to bracket 9. The air supply valve in this example is a 3/2-way pneumatic valve.

It will be appreciated that FIG. 1 depicts the cutting device with movable blade 6 in a withdrawn position prior to a cutting cycle. Supply of air to air brake chamber 3 urges blade 6 towards blade 5 to effect cutting of the object between the blades.

Figure 2:
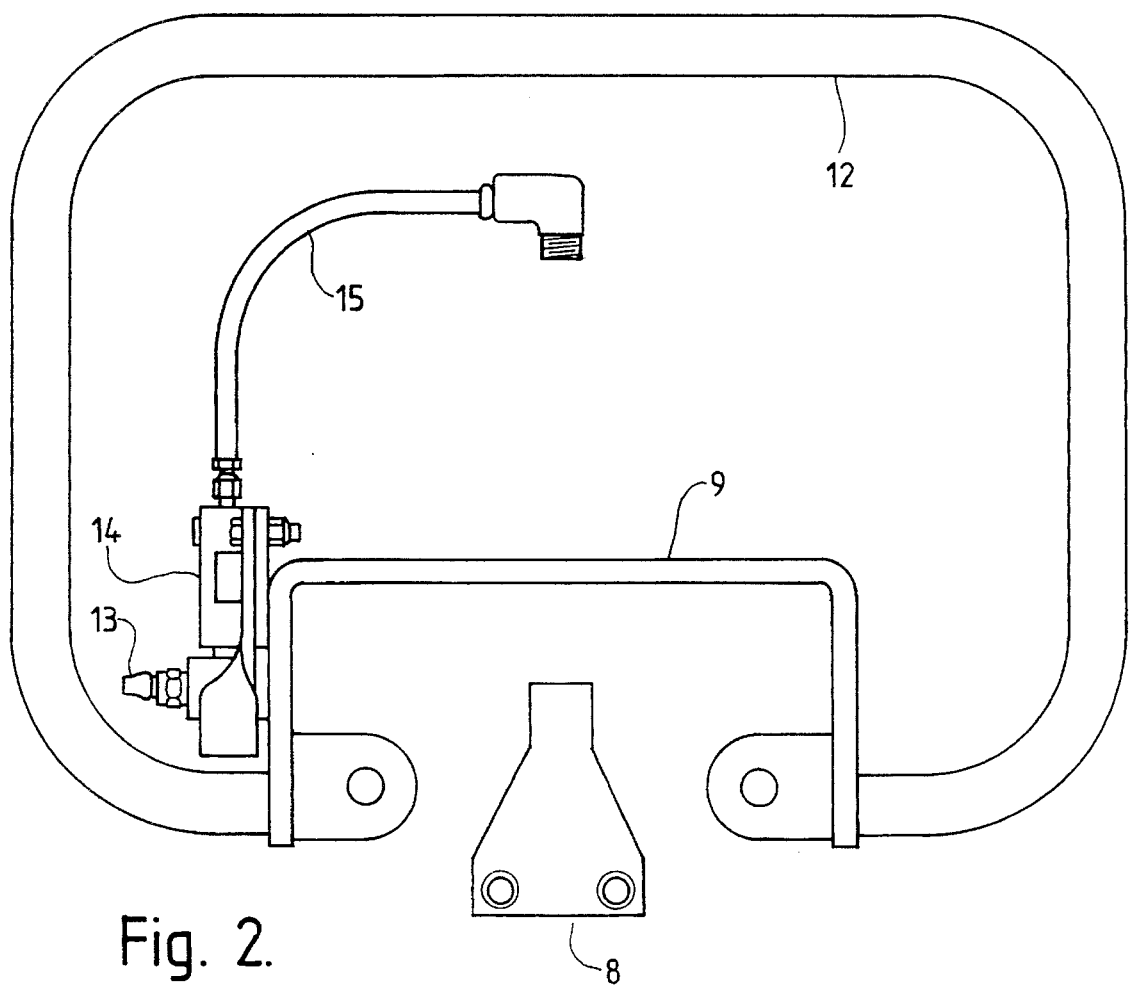
FIG. 2 is the same view as in FIG. 1 with air brake chamber and cutting means removed to provide detail of the coupling member.

Referring now to FIG. 2, there is shown the cutting device of FIG. 1 with the air brake chamber and cutting means frame and blades omitted. Bracket 9, hand grip 12, connector 13, air supply valve 14 and air hose 15 can be seen together with full detail of connecting member 8.

Figure 3:
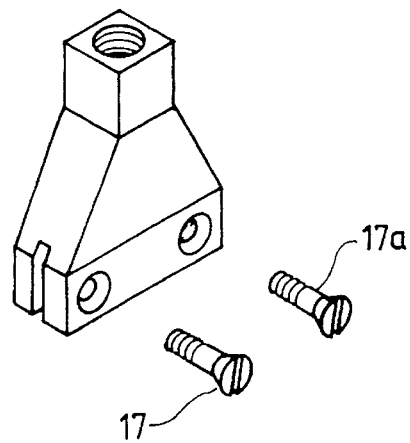
FIG. 3 is a perspective view of the coupling member.

FIG. 3 shows connecting member 8 of FIG. 2 in perspective. Also shown are studs 17 and 17a which secure the movable blade of FIG. 1 to the connecting member.

Figure 4:
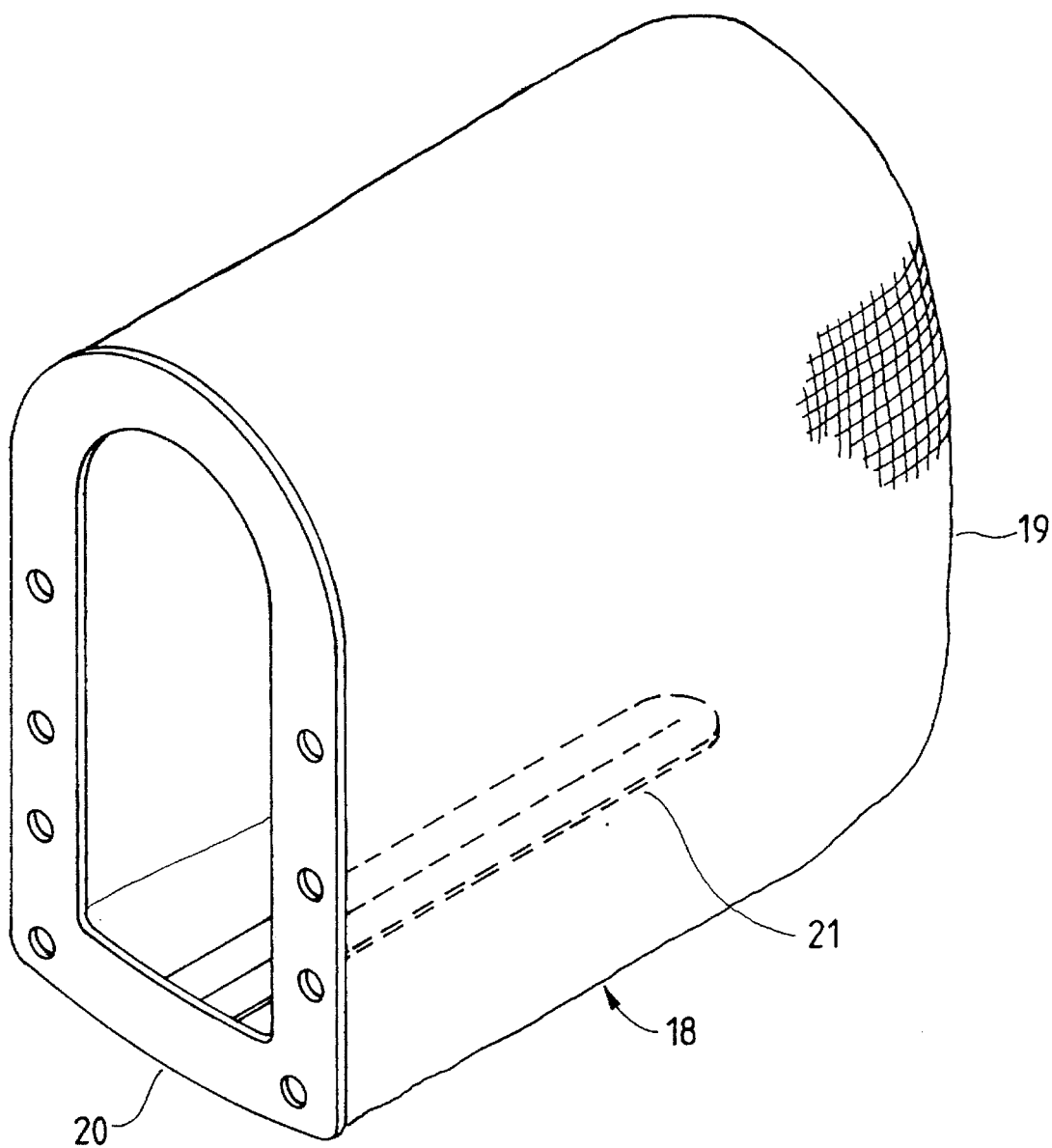
FIG. 4 is a perspective view of a receptacle for severed horns.

FIG. 4 depicts a receptacle for severed horns. Receptacle 18 includes a bag 19 having at the mouth thereof a plate 20 which can be fixed to the frame of a cutting means, such as frame 4 of FIG. 1. Bag 19 has an opening 21 therein, edges of which are defined by resilient members (not shown) which urge the edges towards each other. The edges can however be separated sufficiently to remove a severed horn from the receptacle when the receptacle is fitted to the frame of a cutting means.

Figure 5:
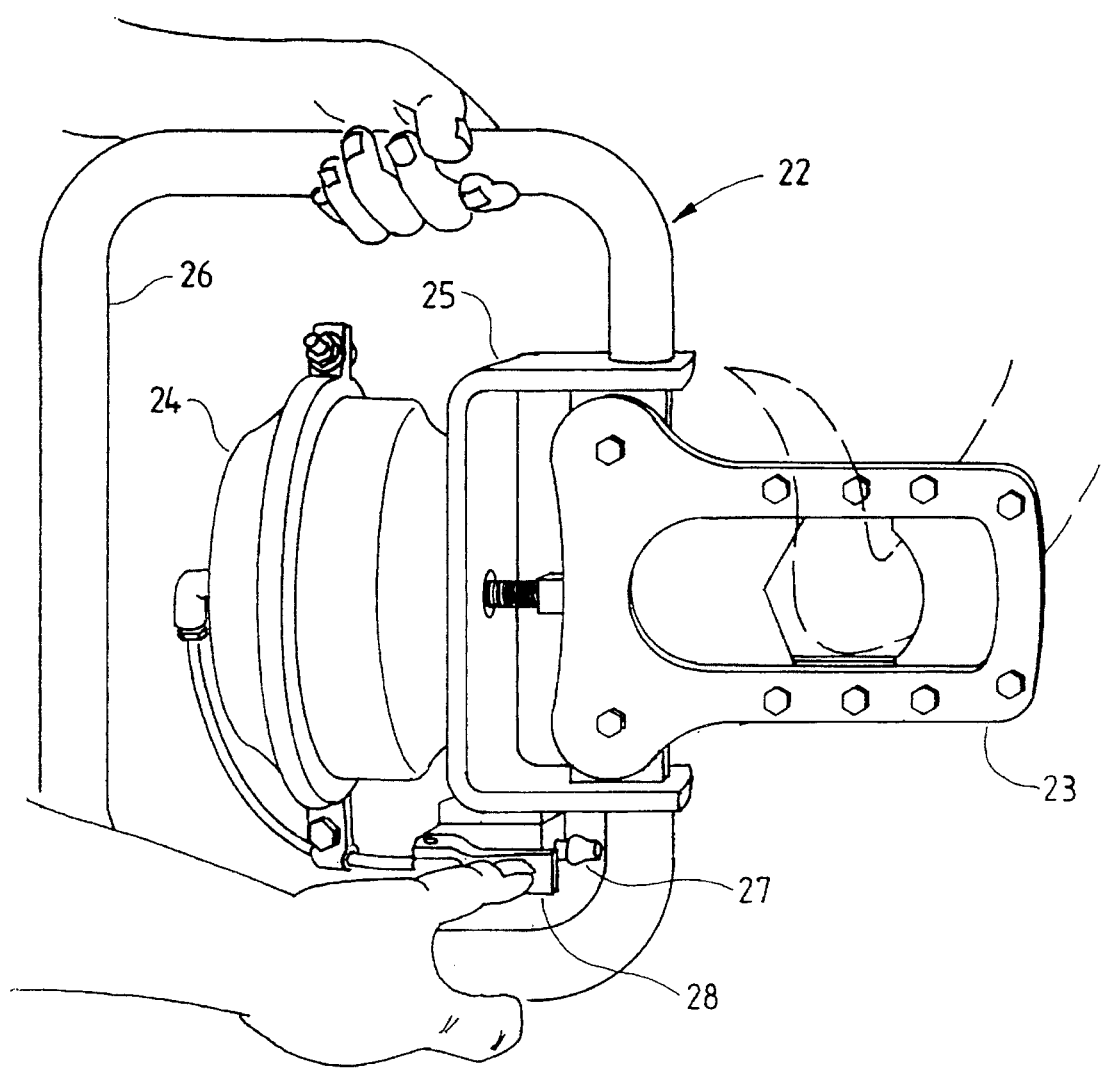
FIG. 5 is a perspective view of a modified form of cutting device held in an in-use position.

Turning to FIG. 5, there is shown another cutting device held in an in-use position for animal dehorning. Cutting device 22 is very similar to the cutting device of FIG. 1 in that it comprises an identical cutting means 23 and air brake chamber 24. Air brake chamber 24 is mounted to cutting means 23 in a slightly different manner in that an angle iron bracket 25 is provided. Cutting device 22 also includes a hand grip 26 and air supply valve 27 which has a trigger 28 in the form of a pushbutton. Other components of the device depicted in FIG. 5 are essentially the same as the components of the FIG. 1 device. It can also be appreciated from FIGS. 1 and 5 that the trigger is positioned intermediate of the air brake chamber and the cutting means. However, it will be appreciated that the term "intermediate" is used in the preceding sentence to include a position which is between but slightly offset with respect to the air brake chamber and cutting means.

It can be appreciated from FIG. 5 that after cutting the horn from one side of an animal, the cutting device can be moved into position for severing the other horn by merely rotating the device through an angle of about 180°. It is not necessary for the operator to change position during this operation. This offers a considerable advantage over known dehorners where the operator must move from one side of the animal to the other for severing horns from each side of the animal.

FIG. 5 shows that a hand grip 26 has a generally C-shaped configuration and extends in the same plane as the frame of the cutting means 23 (the frame is identical to frame 4 of cutting means 2 of FIG. 1). In the area adjacent trigger 28, hand grip 26 is thus laterally spaced away from the trigger. Hence, at least some extension of the thumb of the operator is necessary to contact trigger 28. This minimizes the risk of inadvertent operation of the dehorner. The lateral displacement of the hand grip from the trigger also encourages two-handed gripping of the hand grip as shown in the Figure. This affords greater control over the device which leads to safer operation.

It can be seen that hand grip 12 of the device shown in FIG. 1 is similarly C-shaped and in the area adjacent trigger 16 is laterally spaced away from the trigger so that the thumb of an operator must be at least partially extended to contact the trigger as described above in connection with the FIG. 5 device.

Figure 6:
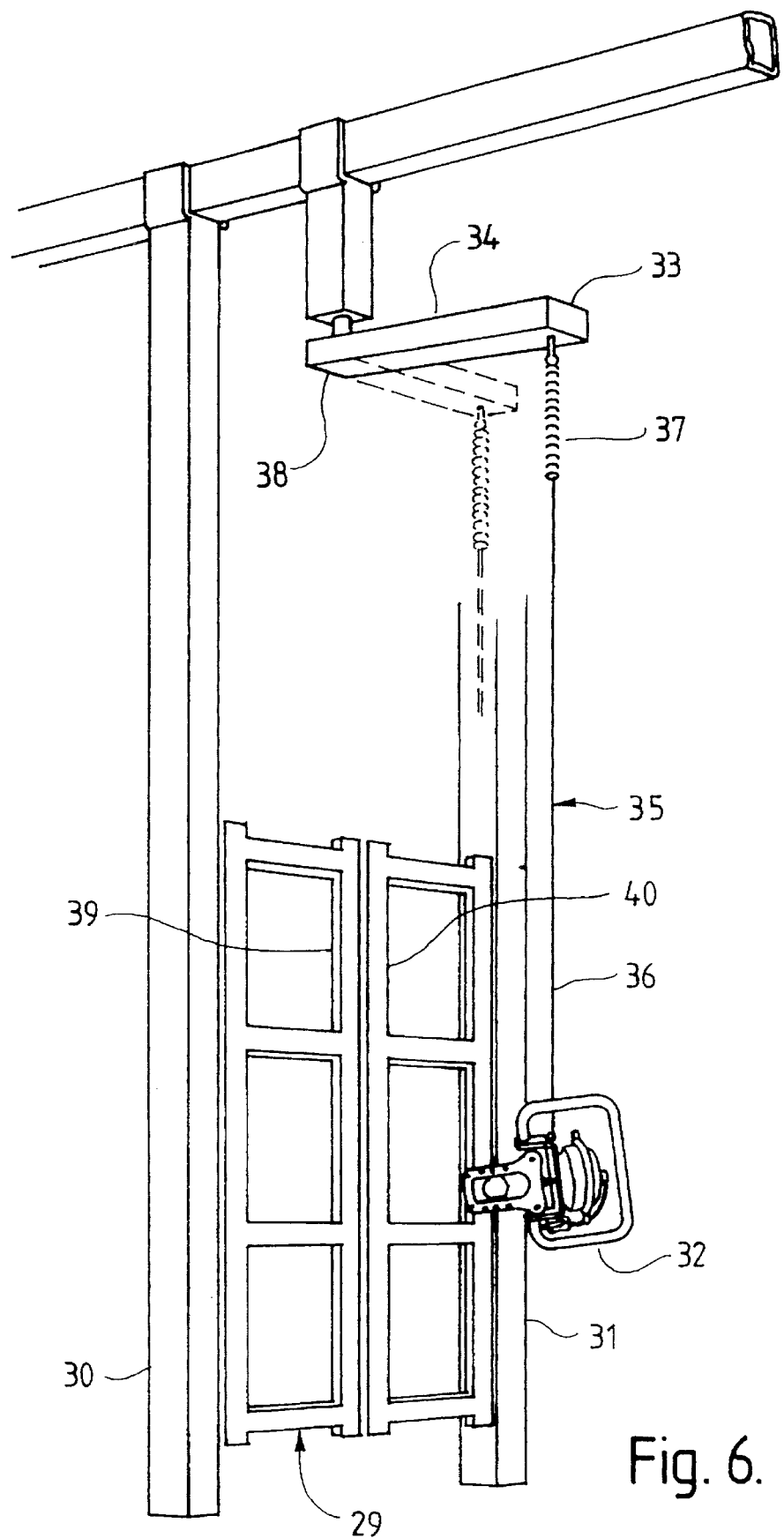
FIG. 6 is a perspective view showing a device suspended adjacent a bail for holding the head of an animal.

FIG. 6 depicts bail 29 which is supported between upright members 30 and 31. A cutting device 32 is suspended from an end 33 of support member 34 by resilient means 35. Resilient means 35 consists of a chord 36 and a coil spring 37 which connects the chord to the support member. The other end 38 of support member 34 is pivotally mounted to allow rotational movement of end 33 in a horizontal plane. This rotational movement allows the cutting device to be swung out of the way to facilitate release of animals from the bail.

For dehorning, the head of an animal will be held between bail doors 39 and 40. Device 32 is suspended so as to be positioned adjacent the head of the animal. However, the device can be urged downwardly because of the resilience in means 35 if required for dehorning a smaller than normal animal. Similarly, the device can be lifted to align the cutting means with the horns of a larger than normal animal. The pivotal mounting of the support member 34 facilitates movement of device 32 from one side of an animal to the other.

The foregoing detailed description of a device for animal dehorning is for exemplification only and it will be appreciated that many modifications can be made thereto without departing from the broad ambit and scope of the invention. It will be further appreciated that embodiments of the invention can be utilized for cutting objects such as cables, wires, ropes, plastic and soft metal extrusions and the like.

I claim:

1. An animal dehorner comprising:

a diaphragm type air brake chamber;

cutting means adapted to be operated by said diaphragm type air brake chamber, said cutting means comprising a frame in which a first blade is fixed and in which a second blade is slidable between a position away from said first blade and a position in which the edge of said second blade overlaps the edge of said first blade, said chamber including a crankshaft coupled to said second blade of said cutting means;

a bracket including a hand grip comprising a continuous member extending in the same plane as said frame from an end of said bracket for supporting said air brake chamber adjacent to said cutting means around the rear of said air brake chamber to the other end of said bracket; and a trigger-operated air supply control valve mounted to said bracket, said trigger being intermediate between said air brake chamber and said cutting means and spaced laterally inwardly of said hand grip, wherein said spacing between said trigger of said air supply control valve and said hand grip is such that at least partial extension of a thumb of an operator's hand when gripping said hand grip is required to operate said trigger.

2. A dehorner according to claim 1, said dehorner further comprising a receptacle for severed horns attached to said cutting means.

3. A dehorner according to claim 2, wherein said receptacle comprises a bag having a sealable opening therein for removal of severed horns from said receptacle.

4. A dehorner according to claim 3, wherein said air brake chamber is a chamber having a diaphragm area of about 36 $in^2$.

5. A dehorner according to claim 1, further comprising means for suspending said dehorner from above, wherein said means is attached to said dehorner at or near the center of gravity thereof.

6. A dehorner according to claim 5, wherein said means is resilient.

7. An animal dehorner comprising:

a diaphragm type air brake chamber;

cutting means (2) adapted to be operated by said diaphragm-type air brake chamber (3), said cutting means (2) comprising a frame (4) in which a first blade (5) is fixed and in which a second blade (6) is slidable between a position away from said first blade (5) and a position in which the edge of said second blade (6) overlaps the edges of said first blade (5), said chamber including a crankshaft (7) coupled to said second blade (6) of said cutting means;

a bracket (9) including a hand grip (12) comprising a generally C-shaped continuous member extending in the same plane as said frame from an end of said bracket (9) for supporting said air brake chamber (3) adjacent to said cutting means (2) around the rear of said air brake chamber (3) to the other end of said bracket (9); and a trigger-operated air supply control valve (14) mounted on said bracket (9), said trigger being intermediate between said air brake chamber and said cutting means and spaced laterally inwardly of said hand grip (12) wherein said spacing between said trigger (16) of said air supply control valve (14) and said hand grip (12) is such that at least partial extension of a thumb of an operator's hand is required to operate said trigger (16).

\* \* \* \* \*